United States Patent [19]
Jensen

[11] 4,181,401
[45] Jan. 1, 1980

[54] FIBER OPTIC WAVEGUIDE CONNECTOR

[75] Inventor: Floyd J. Jensen, Watsonville, Calif.

[73] Assignee: S. C. Cabling, Inc., Freedom, Calif.

[21] Appl. No.: 889,655

[22] Filed: Mar. 24, 1978

[51] Int. Cl.² ............................................. G02B 5/14
[52] U.S. Cl. ............................... 350/96.21; 350/96.20
[58] Field of Search ............... 350/96.20, 96.21, 96.22

[56] References Cited

U.S. PATENT DOCUMENTS

| 3,954,338 | 5/1976 | Hennel et al. | 350/96.21 |
| 4,102,561 | 7/1978 | Hawk et al. | 350/96.21 |

FOREIGN PATENT DOCUMENTS 2616876  10/1977  Fed. Rep. of Germany ........ 350/96.20

*Primary Examiner*—Stewart J. Levy
*Attorney, Agent, or Firm*—Harry E. Aine

[57] ABSTRACT

In a fiber optic waveguide connector a plurality of sector jaw members, such as three elongated 120° sector shaped jaw members are arranged around the end portion of the fiber optic waveguide to be connected. An elastic O-ring encircles the jaw members for clamping the jaw members around the outer periphery of the fiber optic waveguide which is to be aligned with a second optical element, such as a light emitting diode, or other optical transducer including another fiber optic waveguide. The clamped assembly of sector jaw members and fiber optic waveguide is disposed within a cylindrical bore in a connector housing structure. The jaw members are independently radially adjusted by means of a plurality of adjustment screws arranged around and passing through the housing to obtain precise axial alignment of the fiber optic waveguide being connected to the second optical element.

9 Claims, 3 Drawing Figures

U.S. Patent
Jan. 1, 1980
4,181,401
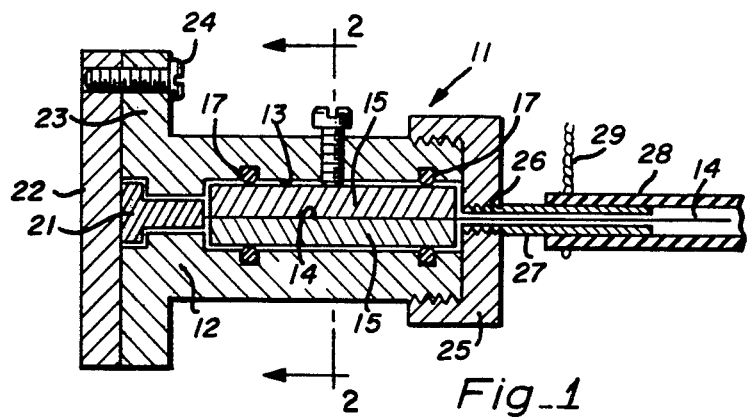
Fig_1
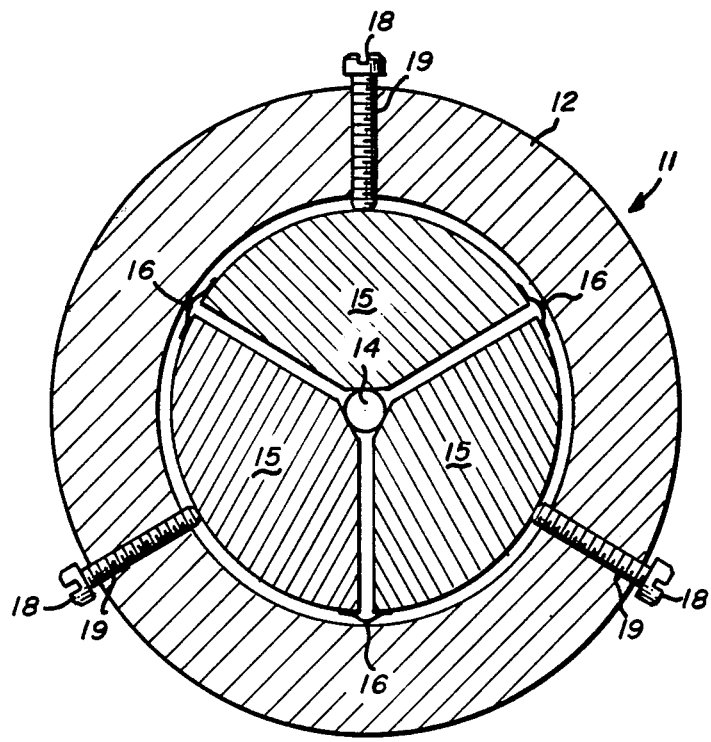
Fig_2
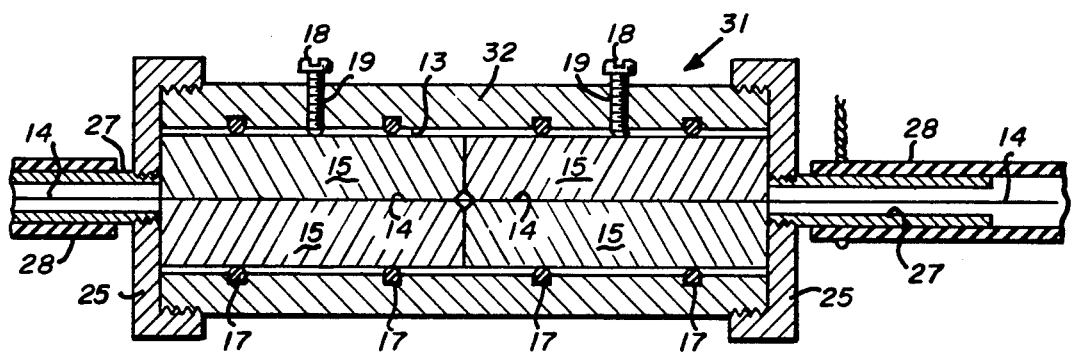
Fig_3

FIBER OPTIC WAVEGUIDE CONNECTOR

BACKGROUND OF THE INVENTION

The present invention relates in general to fiber optic waveguide connectors and, more particularly, to an improved fiber optic waveguide connector employing a plurality of radially adjustable jaw members.

DESCRIPTION OF THE PRIOR ART

Heretofore, fiber optic waveguide connectors have been proposed which employed a collet assembly comprising a pair of semicylindrical jaw members which were clamped together on opposite sides of the fiber optic waveguide member. The fiber optic waveguide was accurately positioned within the semicylindrical jaw members by means of an alignment jig. The assembled collet members were then inserted within a cylindrical bore of a bushing holder assembly. The holder assembly in-turn was inserted within a second cylindrical bore in a housing with a resilient elastic material surrounding the holder and interposed between the holder and the cylindrical bore of the housing. Adjustment screws passed through threaded bores in the housing for adjusting the axial alignment of the holder and therefore the axial alignment of the fiber optic waveguide within the holder to achieve coaxial alignment of the fiber optic waveguide with a second optical element to be optically coupled thereto. Such a fiber optic waveguide connector is disclosed in U.S. patent Ser. No. 3,954,338 issued May 4, 1976.

The problem with this aforecited prior art waveguide connector is that it requires an accurate jig assembly to position the fiber optic waveguide element within the collet members, which are in-turn inserted into the bushing holder member which is then inserted within the housing.

It would be desirable if a fiber optic waveguide connector could be provided which did not require the special jigging fixtures and which would have fewer parts.

The state of the art relative to fiber optic waveguide connectors is reported in an article titled "Fiber Optic Developments Spark Worldwide Interest", appearing in *Electronics,* Aug. 5, 1976, pgs. 81-104 and in an article titled "Communicating With Light", appearing in the November 1976 issue of *Electronics Products Magazine,* pgs. 29-42. Most of these connectors involve insertion of the fiber optic waveguide member or members into a holder which is then adjusted within the housing for alignment of the fiber optic waveguide with the second optical device to which the fiber optic waveguide is to be coupled.

SUMMARY OF THE PRESENT INVENTION

The principal object of the present invention is the provision of an improved fiber optic waveguide connector which will provide adjustment of the axial alignment of the fiber optic waveguide which is to be coupled to a second optical element.

In one feature of the present invention, the fiber optic waveguide member, which is to be coupled to the second optical element, is held by a sector jaw structure including a plurality of movable sector jaw members holding the fiber optic waveguide at their inner ends, such sector jaw members being encircled by an elastic material and positioned within a housing with adjustment members passing through the housing for adjusting the axial alignment of the fiber optic waveguide member as held by the sector jaw structure.

In another feature of the present invention, adjacent sector jaw portions are linked together to facilitate handling in use.

Other features and advantages of the present invention will become apparent upon a perusal of the following specification taken in connection with the accompanying drawings wherein;

DESCRIPTION OF THE DRAWINGS

FIG. 1 is a longitudinal sectional view of a fiber optic waveguide connector incorporating features of the present invention, FIG. 2 is an enlarged sectional view of a portion of the structure of FIG. 1 taken along line 2—2 in the direction of the arrow, and FIG. 3 is a longitudinal sectional view similar to that of FIG. 1 depicting an alternative embodiment of the present invention.

DESCRIPTION OF THE PREFERRED EMBODIMENTS

Referring now to FIGS. 1 and 2, there is shown the fiber optic waveguide connector 11 incorporating features of the present invention. The connector 11 includes a housing member 12, as of aluminum, having a hollow cylindrical axially directed bore 13 therein. A fiber optic waveguide element 14 or bundle of fiber optic waveguide elements is disposed in substantial axial alignment within the bore 13. Three or more sector jaw members 15 are disposed within the housing 12 surrounding the fiber optic waveguide element 14 for holding same.

In a preferred embodiment, the sector jaw members 15 comprise three such members located at 120° intervals of arc around the periphery of the fiber optic waveguide element 14. The individual sector jaw members 15 are linked together at their outer periphery by means of resilient tabs or hinges 16 to facilitate handling of the sectors 15 without misplacing one of the members from the set. A pair of rubber O-rings 17 are disposed within annular recesses in the inner bore 13. The inner diameter of the O-rings 17 is preferably smaller than the outside diameter of the sector jaws so that the O-rings exert a radially directed resilient force on the jaw members 15 for clamping the jaw members into engagement, at their respective inner ends, against the outer periphery of the fiber optic waveguide element 14. As an alternative to having the O-rings carried within annular recesses in the wall of the bore 13, the recesses may be provided in the outer periphery of the sector jaw members 15 so that the sector jaw members with the resilient elastic O-rings mounted thereon may be inserted as a unit within the bore 13 of the housing 12.

A plurality of adjustment screws 18 pass through radially directed threaded bores 19 in the housing 12. The tapped bores 19 and adjustment screws 18 are preferably provided at 120° intervals about the periphery of the housing 12 so as to be positioned in the center of the arc subtended by each of the sector shaped jaw members 15.

The second optical element 21, which is to be optically aligned with the inner end of the fiber optic waveguide 14, such as a light emitting diode, is mounted within one end of the housing 12 in axial alignment with the axial center line of the bore 13. In a typical example, the light emitting source 21 is carreid from a flange member 22 which is mounted to a flanged end 23 of the housing 12 via the intermediary of a plurality of screws 24.

A threaded cap 25 is threadably mated with the other end of the housing 12. The cap 25 includes a central threaded bore 26 which threadably receives the external threaded end of a stainless steel tube 27. A resilient plastic sleeve 28 is tied over the tubing 27 by tie 29. The plastic sleeve 28 serves as a stress relief member to prevent excessive bending of the fiber optic element contained within the sleeve 28 in the vicinity of the connector 11.

The inner end of the fiber optic waveguide element 14 is positioned a distance approximately 1/10 of the diameter of the fiber optic waveguide 14 from the light emitting surface of the second optical element 21.

Referring now to FIG. 3, there is shown a fiber optic waveguide connector 31 for connecting together two fiber optic waveguides. The apparatus is substantially similar to that shown and described with regard to FIGS. 1 and 2 with the exception that the connector housing 12 of FIGS. 1 and 2, is not flanged at 23 but merely is elongated to include two similar connector portions disposed in axial alignment within a common hollow cylindrical housing 32. Each end of the housing 32 is closed off by an end cap 25 and the fiber optic waveguide elements 14 to be connected together are inserted into the cylindrical housing 32 from opposite ends of the housing. The inner ends of the fiber optic waveguide elements 14 are spaced axially apart approximately by a distance of 1/10th of their diameters and each fiber optic waveguide element 14 is surrounded by its set of sector jaw members 15 for obtaining precise axial alignment of the fiber optic waveguides being coupled together.

As an alternative to the fiber optic connector 11 of FIGS. 1 and 2 the transducer element 21 which is to be coupled to the fiber optic waveguide 14 need not be a light emitting source 21 but may comprise light detector 21.

In a typical example of the fiber optic waveguide connector of the present invention, the fiber optic waveguide element 14 has a diameter within the range of 0.002 inch to 0.011 inch and the flat or land at the inner end of the respective sector jaw member, in the case of three sector jaw members 15, preferably has a cord length related to the fiber optic diameter in accordance with the following table.

TABLE

| FIBER DIAMETER | CORD LENGTH IN THOUSANDS OF AN INCH |
|---|---|
| 0.002" | 3.5 |
| 0.003" | 5.2 |
| 0.004" | 6.9 |
| 0.005" | 8.7 |
| 0.006" | 10.4 |
| 0.007" | 12.1 |
| 0.008" | 13.9 |
| 0.009" | 15.6 |
| 0.010" | 17.3 |
| 0.011" | 19.1 |

The stainless steel tube 27, in a typical example, has an ID of 0.022 inch with a 0.015 inch wall thickness and is approximately 0.75 inch long. The plastic tube 28 can be provided in sizes from 24 to 30 gauge Teflon and is fastened to the stainless tube or needle 27 via a typical tie wrap.

The advantage to the fiber optic waveguide connector of the present invention is that it provides a means for readily adjusting the axial alignment of the fiber optic waveguide with the optical device to which it is coupled and at the same time it facilitates assembly of the coupler by avoiding the use of special jigs and the like for loading the fiber optic waveguide into the collet.

What is claimed is:

1. In a fiber optic waveguide connector;
    housing means for housing at least the end portion of a fiber optic waveguide to be connected in axial alignment with a second optical element for transmission of optical wave energy through said fiber optic waveguide;
    sector jaw means for disposition around that portion of the fiber optic waveguide to be disposed within said housing means and which is to be connected to the second optical element, said sector jaw means including a set of movable sector jaw portions for bearing at their inner ends against the outer surface of the fiber optic waveguide and for holding the fiber optic waveguide within said housing;
    resilient retaining means for disposition within said housing means and for exerting on said sector jaw means a radially inwardly directed force on each of said movable sector jaw portions and for holding the inner ends of said sector jaw portions in engagement with the outer surface of the fiber optic waveguide; and
    adjustment means passing through said housing means for urging respective ones of such sector jaw portions radially of the fiber optic waveguide for adjusting the axial alignment of the fiber optic waveguide as held by said sector portions relative to the second optical element.

2. The apparatus of claim 1 including a source of light means comprising the second optical element to be aligned with said fiber optic waveguide for providing a source of light to be transmitted from said source means through said fiber optic waveguide.

3. The apparatus of claim 1 including a light detector means comprising the second optical element to be aligned with the fiber optic waveguide for receiving light transmitted to said light detector means through the fiber optic waveguide.

4. The apparatus of claim 1 wherein said resilient retainer means comprises an elastic member encircling said detector jaw means and bearing radially inwardly on said plurality of movable sector jaw portions for urging said sector jaw portions into engagement with the fiber optic waveguide.

5. The apparatus of claim 1 wherein said adjustment means comprises a plurality of threaded adjustment members for passing radially through and threadably mating with threaded bores in said housing means.

6. The apparatus of claim 1 including a second fiber optic waveguide comprising the second optical element to be axially aligned and connected with said first fiber optic waveguide for transmission of optical wave energy between said first and second fiber optic waveguides.

7. The apparatus of claim 1 including means interconnecting adjacent ones of said movable sector jaw portions for retaining said movable sector jaw portions together as a subassembly.

8. The apparatus of claim 1 including end cap means threadably mating with said housing means for closing off one end of said housing, said cap means including a central bore therethrough for passage of the fiber optic waveguide member therethrough.

9. The apparatus of claim 8 including tubular protective means coaxially mounted of said central bore in said end cap means for surrounding the fiber optic waveguide.

* * * * *